April 17, 1934.  A. G. HOPKINS  1,954,874
CANISTER WITH HINGED COVER
Filed Jan. 26, 1932
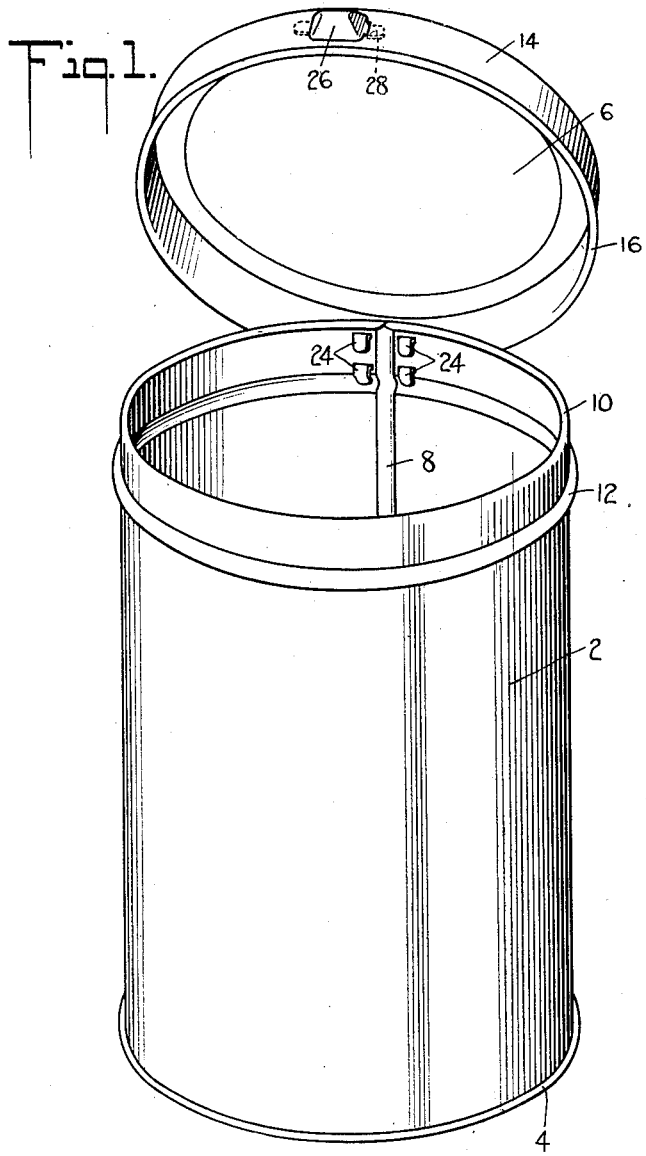
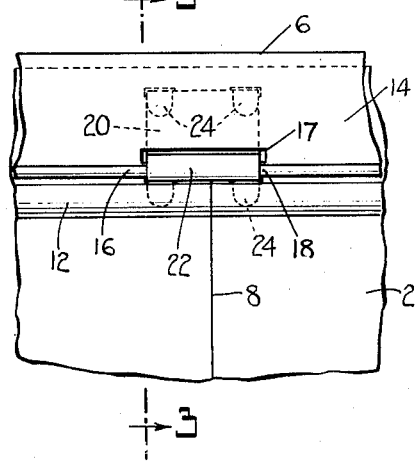
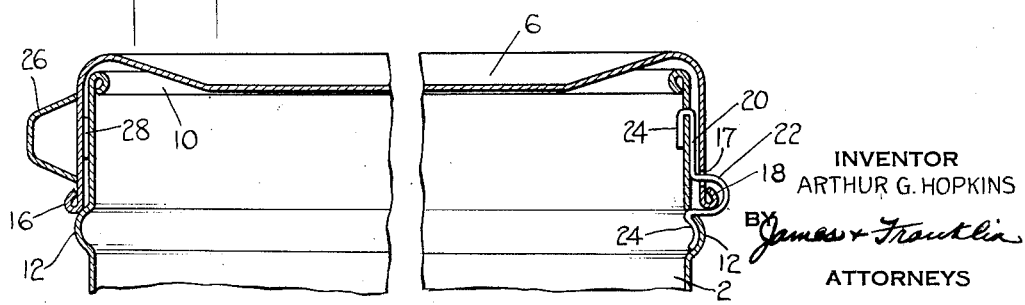
INVENTOR
ARTHUR G. HOPKINS
BY *James + Franklin*
ATTORNEYS Patented Apr. 17, 1934

1,954,874

UNITED STATES PATENT OFFICE 1,954,874

CANISTER WITH HINGED COVER

Arthur G. Hopkins, Maspeth, N. Y., assignor to Metal Package Corporation, New York, N. Y., a corporation of Delaware Application January 26, 1932, Serial No. 588,849

3 Claims. (Cl. 220—32)

This invention relates to sheet metal containers, and more particularly to a sheet metal canister provided with a hinged cover.

A familiar type of canister is the sheet metal kitchen canister which comprises a generally cylindrical container having a completely detachable cover. These canisters are usually provided in a series either of uniform size or of progressively diminishing size, and are intended to receive and store products such as flour, sugar, coffee, tea, and the like.

The present invention centers about kitchen canisters of the described type, and the primary object of the invention is to provide such a canister with a hinged cover. Another and more particular object of the invention is to provide such a cover which will fit the body of the canister rather securely and snugly so as to protect the food products stored therein, and yet which will not bind when the cover is opened or closed even if the cover is provided with a relatively deep flange. A further object of the present invention is to accomplish the foregoing results by a hinge construction which may be manufactured in a simple and inexpensive manner, and yet which operates efficiently and effectively and does not mar the appearance of the canister. The cylindrical wall of the canister is preferably made of rolled sheet metal the meeting edges of which are joined by a longitudinal seam, and an additional object of the present invention is to so locate the aforesaid seam relative to the hinge construction of the cover that the seam will ordinarily not be visible to the eye and therefore will in no way detract from the finished appearance of the canister. In accordance with another object of the present invention, the cover of the canister may be provided with a sheet metal knob in order to facilitate opening and closing the same. A still further object of the invention is to devise a sheet metal construction embodying and fulfilling the foregoing objects, which construction, however, will dispense with soldering or like expensive manufacturing operation.

To the accomplishment of the foregoing and such other objects as may hereinafter appear, my invention consists in the sheet metal canister elements and their relation one to the other as hereinafter are more particularly described in the specification and sought to be defined in the claims. The specification is accompanied by drawing, in which:

Fig. 1 is a perspective view of a canister embodying features of the present invention, showing the cover partially open;

Fig. 2 is an enlarged fragmentary elevation of the rear of the canister, showing the hinge construction; and Fig. 3 is a vertical section taken in the plane of the line 3—3 in Fig. 2.

Referring to the drawing, the canister comprises a rolled cylindrical container wall 2, a bottom wall not visible in the drawing but secured to the cylindrical wall 2 by any appropriate conventional seam 4, said bottom wall serving to permanently close the lower end of the cylindrical wall 2, and a hinged cover 6 for closing the upper end of the container.

The cylindrical container wall 2 is preferably made of rolled sheet metal the meeting edges of which are secured by a longitudinal seam 8 which may be of any desired or conventional type. The upper edge of the cylindrical wall 2 is preferably rolled over to form a smooth bead 10. Below the bead 10 a distance approximately equal to the depth of the cover 6, there is provided an outwardly projecting annular bead 12 which acts as a seat for the cover when the cover is closed.

The cover 6 comprises a single piece of sheet metal which is rather deeply dished to form a flange 14 which fits the upper portion of the cylindrical wall 2. The lower edge of the flange 14 is rolled outwardly to form a large and well-rounded bead 16. The sheet metal of flange 14 is cut away above a portion of the bead 16, this being best shown at 17 in Fig. 2 of the drawing. The portion 18 of the bead thus exposed is used as a hinge pintle, and the length thereof is relatively limited in order to avoid the effect of curvature of the circular bead.

The hinge is completed by a housing plate 20 which is formed into a channeled portion 22 which rather loosely receives and houses the hinge pintle 18. The plate 20 is secured to the cylindrical wall of the canister by a tongue and slot construction which in preferred form consists of four tongues 24 and mating slots to receive the same, as is clearly shown in all three figures of the drawing. The relatively loose fit between the hinge plate 20 and the hinge pintle 18 permits of a smooth and satisfactory hinge action despite the depth of the flange 14 of cover 6. The cover may thus be made to fit the canister sufficiently tightly to properly protect the food contents, without any danger of binding when it is attempted to open or close the cover. The meeting of the ridge 12 on the canister body, and bead 16 on the cover, additionally serves to seal the contents of the canister.

It should be noted that the hinge plate 20 is preferably located astride the seam 8 of the cylindrical canister wall. This is so because the canister is ordinarily placed on a shelf with the hinge to the rear, so that it may be conveniently opened by lifting the front portion of the cover. By relating the hinge and seam as described, the seam is ordinarily concealed from view and in no way mars the finished appearance of the canister.

To facilitate opening and closing the cover of the canister, a knob 26 may be provided, and this is preferably located on the flange 14 at a point opposite the hinge. Knob 26 may be directly pressed from sheet metal, and, if desired, may be secured to the cover by a tongue and slot construction including tongues 28 passing through mating slots in flange 14.

It will be understood that the construction here illustrated may, if desired, be varied by rolling the bead 16 around a reinforcing bead wire. In such case the hinge pintle may be formed by cutting away the sheet metal at and around the bead wire, so that the bead wire alone acts as a hinge pintle, or, if preferred, the flange 14 may be cut away just above the bead 16, and the bead as well as the inside reinforcing wire may be used as a hinge pintle. The arrangement here shown, however, illustrates the invention in a relatively simple and inexpensive form in which no reinforcing bead wire is employed.

It is believed that the mode of constructing the improved hinged canister of my invention, and the many advantages thereof, will for the most part be apparent from the foregoing detailed description thereof. The canister is provided with a hinged cover which may be operated conveniently and can never be mislaid or lost as frequently happens with the ordinary canister having a completely removable cover. The cover is deeply flanged and seats on the body of the canister with a desirable snug fit, and yet in no way binds during the opening and closing operation. The opening and closing of the canister may be facilitated by the use of a knob which is simple and inexpensive in construction, and yet which enhances the appearance of the canister. The hinge construction is exceedingly simple and inexpensive to manufacture, and yet is efficient and effective in operation. The longitudinal seam on the canister body is ordinarily concealed from view, it being aligned with the hinge for the cover. The entire construction of the canister may be carried out without the use of soldering or like manufacturing operation, so that the complete product may be marketed at a price little if any greater than the price of the ordinary canister having a completely detachable cover.

It will be apparent that while I have shown and described my invention in preferred form, many changes and modifications may be made in the structure disclosed, without departing from the spirit of the invention, defined in the following claims.

I claim:

1. A sheet metal kitchen canister comprising a generally cylindrical container, a bottom wall closing the lower end of said container, and a hinged cover closing the upper end of said container, said cover being relatively deeply flanged and being provided with a bead at its lower edge, the sheet metal being cut away near a portion of the bead in order to form a single hinge pintle of substantial length, said pintle being relatively loosely received and housed by a sheet metal plate secured directly to the side wall of the canister.

2. A sheet metal canister comprising a rolled cylindrical container wall the meeting edges of which are secured by a longitudinal seam, a bottom wall closing the lower end of said cylindrical wall, and a hinged cover closing the upper end of said container, said cover being relatively deeply flanged and being provided with a bead at its lower edge, the sheet metal being cut away above a portion of the bead in order to form a hinge pintle, said pintle being relatively loosely received and housed by a sheet metal plate secured by a tongue and slot construction to the wall of the canister across the aforesaid longitudinal seam.

3. A sheet metal kitchen canister comprising a rolled cylindrical container wall, a bottom wall closing the lower end of said container, a hinged cover closing the upper end of said container, said cover being relatively deeply flanged and being provided with a bead at its lower edge, the sheet metal being cut away above a portion of the bead in order to form a hinge pintle, said pintle being relatively loosely received and housed by a sheet metal plate secured by a tongue and slot construction to the wall of the canister, and a pressed sheet metal knob secured to the flange of the cover opposite the hinge by a tongue and slot construction, the cylindrical wall of the canister being provided with an outwardly pressed annular bead spaced from the top of the canister and acting as a seat for the cover when the cover is closed.

ARTHUR G. HOPKINS.